United States Patent [19]
Belart

[11] Patent Number: 4,656,833
[45] Date of Patent: Apr. 14, 1987

[54] HYDRAULIC BRAKE SYSTEM FOR AUTOMOTIVE VEHICLES

[75] Inventor: Juan Belart, Walldorf, Fed. Rep. of Germany

[73] Assignee: ITT Industries Inc., New York, N.Y.

[21] Appl. No.: 597,517

[22] Filed: Apr. 6, 1984

[30] Foreign Application Priority Data

Apr. 29, 1983 [DE] Fed. Rep. of Germany ....... 3315731

[51] Int. Cl.[4] .............................................. F15B 7/00
[52] U.S. Cl. ....................................... 60/545; 60/413; 60/560; 60/582; 91/28
[58] Field of Search ...................... 91/28; 60/545, 560, 60/582, 563, 413

[56] References Cited

U.S. PATENT DOCUMENTS

| | | | |
|---|---|---|---|
| 2,945,352 | 7/1960 | Stelzer | 91/28 |
| 3,080,718 | 3/1963 | Clary | 60/431 |
| 4,034,566 | 7/1977 | Suketomo et al. | 60/413 |
| 4,242,867 | 1/1981 | Belart | 60/413 |
| 4,285,198 | 8/1981 | Budecker | 60/582 |
| 4,477,125 | 10/1984 | Belart et al. | 60/582 |
| 4,483,144 | 11/1984 | Steffes | 60/563 |

Primary Examiner—Abraham Hershkovitz
Attorney, Agent, or Firm—James B. Raden; William J. Michals

[57] ABSTRACT

A hydraulic brake system for automotive vehicles with a master brake cylinder (51) and with a hydraulic power booster (49) connected upstream of the master brake cylinder, in which a pressure medium pump (18) which may be driven by an electric motor (17) is used for providing an auxiliary hydraulic energy, the drive of which may be switched on by a pressure accumulator (1), on the one hand, and by a brake pedal contact (58), on the other hand, in the unbraked operation of the automotive vehicle the pressure accumulator (1) permanently being kept on a pressure level sufficient for an initial actuation of the brake and the charge of the pressure accumulator (1) being monitored by a pressure control valve (19). In view of an energy demand of the brake system which will be as low as possible, this invention suggests that a valve passage (40, 42) of the valve arrangement (19) is operable by a pressure in the booster chamber of the hydraulic power booster (49) such as to establish a direct communication between the outlet of the pressure medium pump (18) and the pressure medium port of the hydraulic power booster (49).

8 Claims, 1 Drawing Figure

U.S. Patent    Apr. 14, 1987    4,656,833
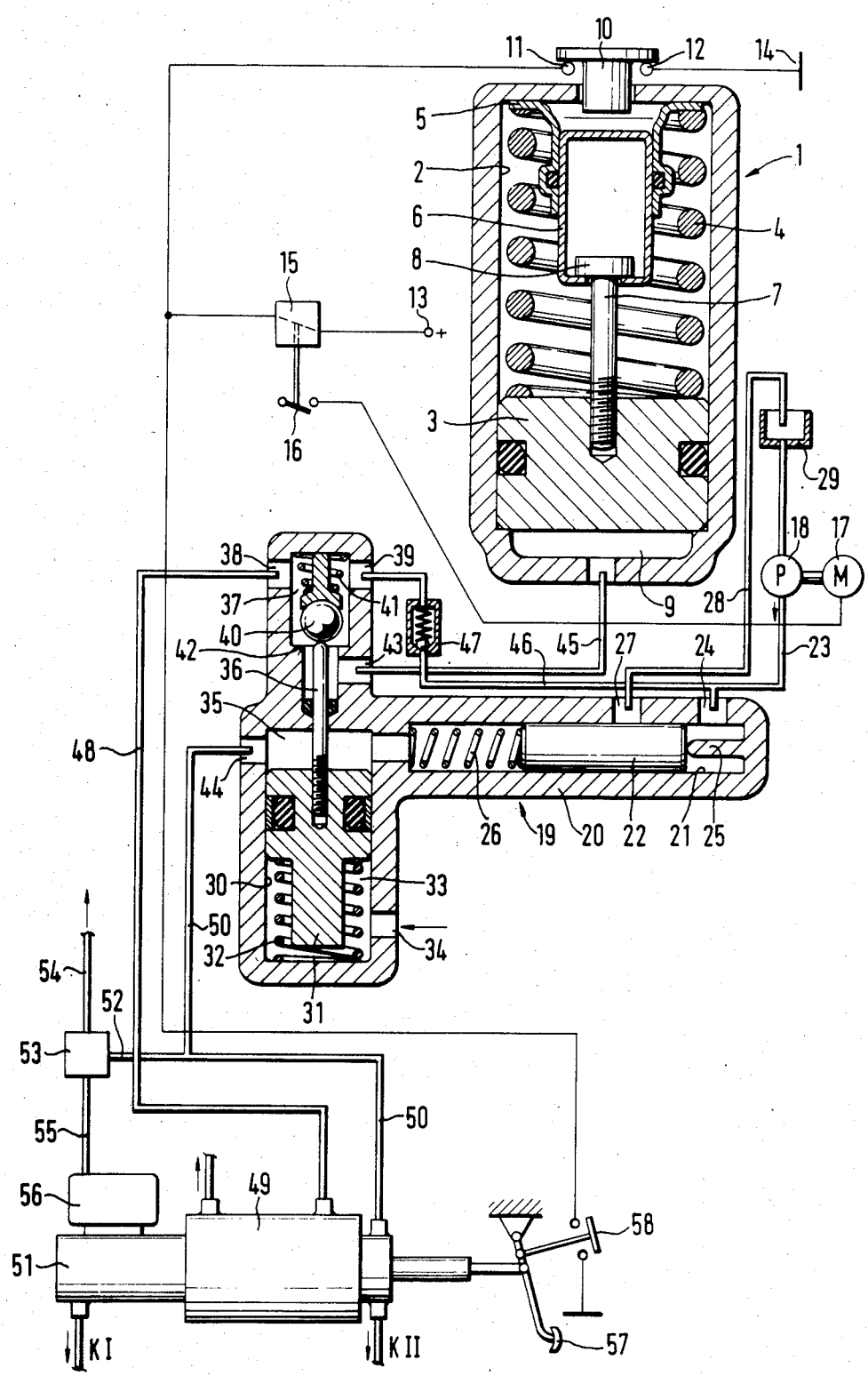

HYDRAULIC BRAKE SYSTEM FOR AUTOMOTIVE VEHICLES

BACKGROUND OF THE INVENTION

This invention relates to a hydraulic brake system for automotive vehicles with a master brake cylinder and with a power booster connected upstream of the master brake cylinder, in which a pressure medium pump which may be driven by an electric motor is used for providing an auxiliary hydraulic energy, the drive of which may be switched on by a pressure accumulator, on the one hand, and by a brake pedal contact, on the other hand, in the unbraked operation of the automotive vehicle the pressure accumulator permanently being kept on a pressure level sufficient for an initial actuation of the brake and the charge of the pressure accumulator being monitored by a pressure control valve.

A hydraulic brake system featuring the above characteristics is described in the prior patent application No. P 32 47 498.9. In the hydraulic brake system according to the prior suggestion the delivery side of the pressure medium pump is communicating with the inlet of a pressure medium accumulator via a pressure control valve. Thus during the operation of the automotive vehicle there will be always a predeterminable fluid volume available in the pressure accumulator. To this end, the pressure accumulator disposes over an electric contact which is operable in dependence on the charge of the pressure accumulator and which is connected with the electric motor drive of the pressure medium pump.

In the hydraulic brake system according to the prior suggestion the pressure control valve consequently only serves to monitor the accumulator charge of the hydropneumatic pressure accumulator. As soon as an actuating force is exerted on the brake pedal and the power booster connected upstream of the master brake cylinder adopts an operating position, the fluid volume available in the pressure accumulator will be supplied to the hydraulic power booster. Thus there will be an auxiliary force assistance as early as in the initial phase of the braking action although there is no need for the pressure medium pump to operate in the initial phase of braking.

Due to the relatively small accumulator volume of the hydropneumatic pressure accumulator the pressure fluid volume that has accumulated in the pressure accumulator will be depleted relatively fast. Thus an electric contact at the pressure accumulator will be closed which will switch on the electric motor drive of the pressure medium pump. Thus, upon a continued braking action, the delivery side of the pressure medium pump will permanently communicate with the hydraulic power booster. Thus the delivery provided by the pressure medium pump will be available as auxiliary energy at the hydraulic power booster.

In the described brake system it is to be considered less advantageous that the pressure medium pump whose drive, upon the brake's actuation, remains switched on permanently due to a respective brake pedal contact also wants to charge the pressure accumulator of the hydraulic brake system. Thus, at least partially, the delivery provided by the pressure medium pump will be led into two channels connected in parallel, the hydraulic power booster of the brake system, of course, not being provided with the maximum delivery of the pressure medium pump. Even upon an actuation of the brake, rather, there will be a recharging of the pressure medium accumulator after the pressure medium accumulator had been discharged. Thus, possibly the delivery pressure of the pressure medium pump which will be required at the hydraulic power booster at least temporarily will not be available.

It is thus an object of the present invention to further develop a hydraulic brake system of the type referred to above so as to prevent a new recharging of the pressure medium accumulator after the depletion of said pressure medium accumulator upon the actuation of the brake, thus the entire auxiliary energy made available by the pressure medium pump directly reaching the hydraulic brake booster.

SUMMARY OF THE INVENTION

According to this invention this object is solved in that a valve passage of the valve arrangement is operable by a hydraulic pressure in the booster chamber of the power booster such as to establish a direct communication between the outlet of the pressure medium pump and the pressure medium port of the power booster. The result of such an embodiment is that the contents of the pressure accumulator will be depleted relatively fast in the initial phase of the brake's actuation, a sufficient auxiliary force assistance being guaranteed, though. The pressure medium pump controllable via a brake pedal contact, amongst others, will likewise start operating upon the actuation of the brake. Thus, after the depletion of the pressure medium volume accumulated in the pressure medium accumulator there will only be the pressure medium pump that will be available for providing an auxiliary energy. However, the pressure medium accumulator will be prevented from being recharged, thus the entire pressure medium supplied by the pressure medium pump being supplied to the hydraulic power booster. In an advantageous further development of the subject matter of the application it is provided that the valve arrangement disposes over a further valve passage which, upon the pressurization of the booster chamber, will interrupt the communication between the pressure accumulator and the hydraulic power booster. To this end, in a cylinder bore of the valve arrangement, a control piston is advantageously arranged which is displaceable by the delivery pressure of the pressure medium pump against a control force and which may establish a communication between the delivery side of the pressure medium pump and an unpressurized supply reservoir. In such an embodiment there will be the advantageous result that the pressure accumulator will always be charged up to a structurally predetermined value if the automotive vehicle is not braked. In this operating phase, the control piston of the valve arrangement will only act as pressure control valve controlling the accumulator volume. The compression spring loading the control piston contrary to the pressurization by the pressure medium pump is related such as to ensure that the pressure accumulator has a density of energy sufficient for assisting the braking action in the initial phase of braking. The control force acting on the control piston expediently will be generated by a compression spring which may be adjusted so as to be adapted to differently rated automotive vehicle data.

In an advantageous further development of the subject matter of the application it is provided that the front face of the control piston which is loaded by the compression spring confines a control chamber hydraulically communicating with the booster chamber. The result of such an embodiment will be that, upon the application of the brake, when at first the contents of the pressure accumulator are supplied to respectively the hydraulic power booster or its pressure chamber, the control piston of the valve arrangement will additionally be loaded by a pressure force which will displace the control piston into a final position in which a hydraulic communication is blocked between the delivery side of the pressure medium pump and the unpressurized supply reservoir. In such an axial position of the control piston it will thus already be impossible that the pressure fluid volume provided by the pressure medium pump will escape to the unpressurized supply reservoir, unused. It is further provided that the control chamber hydraulically communicates with a piston which is displaceable against a compression spring and which may operate a connection between the delivery side of the pressure medium pump and the pressure accumulator. Upon the application of the brake thus likewise the piston displaceable against the compression spring will be displaced by the pressure adapted to be metered and supplied into the booster chamber. Thus a connection will be interrupted between the delivery side of the pressure medium pump and the pressure accumulator, hence a direct communication being established between the delivery side of the pressure medium pump and the inlet of the hydraulic power booster.

As regards lock-up protection of the described brake system it may be advantageous if the pressure in the control chamber of the valve arrangement may be influenced by an electromagnetically operable multi-position valve, said multi-position valve being controllable by slip control electronics. Should the slip control electronics, cooperating with sensors scanning the rotational behavior of the wheels, detect the pressure of critical slip values, owing to the multi-position valve, it will be possible to reduce the pressure in respectively the booster chamber of the hydraulic power booster or the control chamber of the valve arrangement. This will directly bring about a reduction of the pressure generated in the master brake cylinder. Thus there will result a corresponding reduction of the braking force and the brake actuating devices supplied with pressure by the master brake cylinder will be pressure-relieved. Because of the reduction of the braking force in the actuating devices of the wheel brakes, as a function of the coefficients of friction between the tires of the automotive vehicle and the road surface, there will ensue a reacceleration of the wheels, thus possibly a lock-up condition being averted. Preferably a 3/2-way solenoid valve is used as multi-position valve. Said valve will provide the possibility of pressure constant in the control chamber of the valve arrangement or in the booster chamber of the hydraulic power booster, respectively. Thus, generally there exist three possibilities of influencing the effective braking pressure of the brake system in dependence on the respective wheel slip prevailing.

BRIEF DESCRIPTION OF THE DRAWING

On example of an embodiment of the invention will be explained in more detail in the following, reference being made to a sectional view illustrated in the drawing.

DETAILED DESCRIPTION

In the drawing, the reference numeral 1 marks a pressure accumulator in which, in a cylinder bore 2, an accumulator piston 3 is supported such as to be displaceable against a compression spring 4. Said compression spring 4 is supported oppositely at a spring plate 5 which forms a part of a bowl-type spring retainer 6. An extension 7 formed at the accumulator piston 3 and having an enlarged head 8 projects into the bowl-type spring retainer 6 which is axially displaceable relative to the spring plate 5 in the direction of movement of the accumulator piston 3 of the pressure accumulator 1. Thus, upon a sufficient pressurization of the chamber 9 averted from the compression spring 4, the head 8 will abut at the bowl-type spring retainer 6, lifting an electric contact 10 off from opposite contacts, 11, 12 and thus interrupting an electric connection between the poles 13, 14 of a battery. Connected in the connection between the poles 13, 14 is an electromagnetic switching relay 15 which disposes over a make contact 16 which may switch on an electric motor 17 which may drive a pressure medium pump 18.

A further component of the inventive brake system is a valve arrangement 19 disposing over a housing 20 provided with a first cylinder bore 21. In said first cylinder bore 21, a control piston 22 is guided. Referring to the drawing, the right-hand front face of said control piston 22 communicates with the delivery side of the pressure medium pump via a pressure line 23 and a housing port 24. In the non-operating condition of the brake system, the control piston 22 rests at an abutment 25 limiting the axial movement of the control piston 22. Said axial position of the control piston 22 is established by a compression spring 26. The housing 20 of the valve arrangement 19 has a housing port 27 besides the housing port 24. In the drawing, said housing port 27 is closed by the control piston 22. An unpressurized supply reservoir 29 is connected to the housing port 27 via a pressure line 28.

In the housing 20 of the valve arrangement 19, a second cylinder bore 30 is provided wherein a piston 31 is guided in a sealed manner against the force of a compression spring 32. The chamber 33 of the valve arrangement 19 accommodating the compression spring 32 communicates with the unpressurized supply reservoir 29 via a housing port 34. Referring to the drawing, the upper front face of the piston 31 confines a control chamber 35 hydraulically communicating with the chamber that accommodates the compression spring 26. Further, a tappet 36 is formed at the piston 31. The tappet 36 projects into a valve chamber 37 wherein housing ports 38, 39 terminate. In the valve chamber 37, essentially a ball 40 is arranged which serves as valve closure member. In the illustrated rest position of the brake system, said ball 40 is lifted off from a valve seat 42 by means of the tappet 36 against the force of a compression spring 41. The valve arrangement further has two further housing ports 43, 44. Via a pressure line 45, the housing port 43 communicates with the chamber 9 of the pressure accumulator 1. Via a pressure line 46, the housing port 39 of the valve arrangement 19 communicates with the delivery side of the pressure medium pump 18 and with the housing port 24 of the valve arrangement 19, respectively. Upstream of the housing port 39 of the valve arrangement 19, a check valve 47 is arranged which prevents the pressure medium from flowing from the housing port 39 to the delivery side of the pressure medium pump.

Via the valve chamber 37 of the valve arrangement 19, a permanent hydraulic passage is established between the housing ports 39, 38, the housing port 38 hydraulically communicating with a hydraulic power booster 49 via a pressure line 48. By means of a brake valve provided in the hydraulic power booster 49, a hydraulic pressure may be adapted to be metered and supplied into the booster chamber of the hydraulic power booster 49. On the one hand, said hydraulic pressure will propagate into a second brake circuit KII. On the other hand, the booster chamber communicates with the housing port 44 of the valve arrangement 19 via a pressure line 50. Thus, in the control chamber 35 of the valve arrangement 19, there will always be the same hydraulic pressure as in the booster chamber of the hydraulic power booster 49.

The hydraulic power booster is followed by a master cylinder 51 supplying a brake circuit KI. A pressure line 52 branches off from the pressure line 50 of the described brake system and leads to a 3/2-way solenoid valve 53 whence, on the one hand, a pressure line 54 leads to the unpressurized supply reservoir 29 and, on the other hand, a pressure line 55 leads to the storage reservoir 56 of the master cylinder 51. The hydraulic power booster 49 is operable by a brake pedal 57 having a brake pedal contact 58 arranged thereon. Upon the actuation of the brake pedal 57, said contact will come into the on-position and will switch on the electromagnetic switching relay. Thus likewise the make contact 16 will close, starting the electric motor 17. Thus the pressure medium pump 18 will supply a corresponding pressure medium stream.

In the following, the mode of operation of the described brake system will be explained in more detail. The description of the operation that is to follow starts from the discharged condition of the pressure accumulator 1 as discernible from the drawing. As a rule, said condition will be established after a prolonged time of standstill of the automotive vehicle. When starting the automotive vehicle, a positive potential will reach the magnet coil of the electromagnetic switching relay 15 connected with the earth contact 14 so that, via the magnet coil of the electromagnetically operable switching relay 15 and via the pressure accumulator's contact 10 closed in this operating condition, an electric connection will be established between the positive pole 13 of the battery and the earth pole 14. This will cause the electromagnetic switching relay 15 to be excited, thus moving the make contact 16 into an on-position in which the electric motor 17 will start operating. As the pressure medium pump 18 is mechanically connected with the electric motor 17, a pressure medium stream will form at the delivery side of the pressure medium pump, said pressure medium stream proceeding to the housing port 24 of the valve arrangement 19 via the pressure line 23. The pressure supplied by the pressure medium pump 18 further will reach the valve chamber 37 of the valve arrangement 19 via the pressure line 46 and the now open check valve. From the valve chamber 37 of the valve arrangement 19 it will flow to the chamber 9 of the pressure accumulator 1 via the opened valve passage 40, 42 and the pressure line 45. In this operating phase, the control piston 22 of the valve arrangement will maintain its position discernible from the drawing, thus the delivery of the pressure medium pump 18 exclusively reaching the pressure accumulator 1 where it will provide a pressure build-up in chamber 9 which finally will be sufficient to displace the accumulator piston 3 of the pressure accumulator 1 against the force of the compression spring 4 upwards in the drawing. A predeterminable pressure being established in chamber 9, the pressure accumulator 1 will thus reach an operating position in which the head 8 connected with the accumulator piston 3 via the extension 7 will abut at the upper limitation of the bowl-type spring retainer 6. Thus the contact 10 will open. Thereby the electromagnetic switching relay 15 will fall off, putting respectively the electric motor 17 and the pressure medium pump coupled with the electric motor 17 out of operation. In such a phase of charging of the pressure accumulator 1 the control piston 22 of the valve arrangement 19 will ensure that any pressure peaks at the delivery side of the pressure medium pump 18 will be relieved towards the unpressurized supply reservoir 29 via the pressure line 28. After a certain charging time, the pressure accumulator 1 will thus have reached a charging condition in which a certain pressurized volume will be available in chamber 9. As, via the pressure lines 45, 48 there is a permanent communication between chamber 9 and the accumulator port of the hydraulic power booster, consequently, the accumulator energy will also permanently be available at the pressure supply port of the hydraulic power booster 49.

As soon as an actuation of the brake pedal 57 initiates a braking action, pressure medium will flow from the pressure line 48 into the booster chamber via the pressure supply port of the hydralic power booster 49. Thus a booster piston not discernible from the drawing will be displaced by the pressurization of a booster chamber, thereby likewise a corresponding pressure being generated in the master cylinder 51. The pressure adapted to be metered and supplied into the booster chamber of the hydraulic power booster 49 will enter the brake circuit KII and pressurize the wheel brakes connected to this brake circut. Further, the brake circuit KI will be pressurized. Thus, immediately after the application of the brake there will be a braking action assisted by the auxiliary hydraulic energy accumulated in the chamber 9 of the pressure accumulator 1. Via the pressure line 50, the booster chamber further communicates with the control chamber 35 of the valve arrangement 19. Thus a pressure adapted to be metered and supplied into the booster chamber, on the one hand, will displace the control piston 22 of the valve arrangement 19 against the axial abutment, assisted by the compression spring 26, while, on the other hand, the upper front face of the piston 31 (see drawing) will be pressurized by the dynamic pressure of the hydraulic power booster 49. Thus the piston 31 of the valve arrangement 19 finally will be displaced against the compression spring 32 downwards (in the drawing). After a certain displacement travel the ball 40 will come to rest at the valve seat 42, thus blocking a hydraulic communication between the pressure medium pump 18 and the pressure accumulator 1.

With a force being exerted on the brake pedal 57, the pedal contact 58 will close. Thereby the electric motor 17 will be switched on permanently and the pressure medium pump 18 will permanently supply pressure at its delivery side. Said pressure will directly reach the auxiliary energy port of the hydraulic power booster 49 via the pressure lines 23, 46, 48.

After thus in the initial phase of braking the auxiliary energy required for the auxiliary force assistance of the brake system was directly obtained from the pressure accumulator 1 subsequently the pressure medium pump 18 will directly take over the task of providing said auxiliary hydraulic energy. In doing so, via the valve passage 40, 42 there will be blocked a hydraulic communication between the outlet of the pressure medium pump 18 and the chamber 9 of the pressure accumulator 1. Thus, the delivery of the pressure medium pump 18 will exclusively be supplied to the hydraulic power booster 49, thus any recharging of the pressure accumulator 1 being prevented until the release of the brake pedal 57.

A further component of the described brake system is a 3/2-way solenoid valve 53 which is controllable by non-represented slip monitoring electronics and by means of which the control chamber 35 of the valve arrangement 19 may be relieved towards the unpressurized supply reservoir 29. The circuitry of the 3/2-way solenoid valve 53 may, however, also be chosen such as to ensure that pressure medium that had been tapped from the brake circuit KI for the purpose of reducing the effective braking pressure in the brake actuating devices will be replaced from the booster chamber of the hydraulic power booster 49 via the storage reservoir 56 in the brake circuit KI.

Upon a removal of the actuating force exerted on the brake pedal 57, at first the brake pedal contact 58 will open. Due to the on-position of the contact 10, the electric motor 17, however, will remain switched on for the time being, thus the pressure medium pump 18 continuing to operate. Because of the pressure now lacking in the control chamber of the valve arrangement 19 the action of the force of the compression spring 32 will cause the piston 31 to adopt the position discernible from the drawing. In said position the valve passage 40, 42 is open, thus the delivery side of the pressure medium pump 18 again communicating with the chamber 9 of the pressure accumulator 1. In the chamber 9 of the pressure accumulator 1 a pressure increase will take place which will last until the pressure accumulator 1 will have reached its predetermined maximum charge and the contact 10 will have opened.

What is claimed is:

1. A hydraulic brake system for use with automotive vehicles comprising:
   a hydraulic fluid pump including means for energizing pump, said means including a motor coupled to said pump and being connectable with an external energy source upon commencing of a vehicle operation;
   a pressure accumulator including a chamber fillable by fluid being supplied by said pump until a predetermined fluid pressure is developed therein;
   said pressure accumulator comprising contact means for connecting said motor with said energy source and interrupting connection therebetween upon accumulation of said predetermined fluid pressure;
   a brake actuator controlling a connection between said motor and said energy source;
   said brake actuator being connected with and regulating a fluid flow to brake circuits via a power booster;
   a control valve means operatively connected between said pressure accumulator and a conduit for blocking a communication between said pump and said pressure accumulator said control valve means being moved by a fluid pressure responsive member to a blocking position upon exhaustion of said fluid pressure into said brake circuits via said booster and upon accumulation of said predetermined fluid pressure in said conduit;
   said fluid pressure exhaustion and motor actuation being triggered by operation of said brake actuator;
   said control valve means including means for permitting a re-charge of said pressure accumulator upon termination of said operation of said brake actuator.

2. A hydraulic brake system as claimed in claim 1, said control valve means having a metering valve blocking said communication by closing a valve passage therein in reaction to fluid pressure in said power booster for blocking of a fluid flow to said pressure accumulator chamber.

3. A hydraulic brake system as claimed in claim 2, wherein a control piston (22) is provided in a cylinder bore (21) of a valve arrangement (19) which is displaceable by the delivery pressure of said pump against a control force and which control piston (22) can establish a communication between the delivery side of the pump (18) and an unpressurized supply reservoir (29).

4. A hydraulic brake system as claimed in claim 3, wherein said control force is generated by a compression spring (26).

5. A hydraulic brake system as claimed in claim 4, wherein a front face of the control piston (22) which is loaded by the compression spring (26) confines a control chamber (35) hydraulically communicating with a booster chamber of said power booster.

6. A hydraulic brake system as claimed in claim 5, wherein the control chamber (35) hydraulically communicates with a piston (31) which constitutes the fluid pressure responsive member and which is displaceable against a compression spring and which may further operate a connection of said communication between the delivery side of the pump (18) and the pressure accumulator (1).

7. A hydraulic brake system as claimed in claim 4, wherein the pressure responsive member is exposed to pressure in a control chamber (35) of the valve arrangement (19), said control chamber being influenced by an electromagnetically operable multi-position valve (53).

8. A hydraulic brake system as claimed in claim 7, wherein said control valve means includes means communicating with said pressure accumulator chamber, said power booster and said pump.

* * * * *